US008187356B2

(12) United States Patent
Probst et al.

(10) Patent No.: US 8,187,356 B2

(45) Date of Patent: May 29, 2012

(54) PROTECTIVE COVER FOR RESPIRATORY DEVICE

(76) Inventors: Teri Probst, Mission, TX (US); James A. Pitchford, Mission, TX (US)

( * ) Notice: Subject to any disclaimer, the term of this patent is extended or adjusted under 35 U.S.C. 154(b) by 559 days.

(21) Appl. No.: 12/347,049

(22) Filed: Dec. 31, 2008

(65) Prior Publication Data

US 2010/0163047 A1 Jul. 1, 2010

(51) Int. Cl.
*B01D 46/00* (2006.01)

(52) U.S. Cl. ............... 55/505; 55/DIG. 31; 55/DIG. 35; 55/DIG. 43; 55/511; 128/205.29

(58) Field of Classification Search .................... 55/511, 55/DIG. 31, DIG. 35, DIG. 43; 96/108, 189; 128/205.27, 205.29, 206.17, 716
See application file for complete search history.

(56) References Cited

U.S. PATENT DOCUMENTS 3,750,665 A * 8/1973 Stranicky ................. 128/206.12
4,197,863 A * 4/1980 Clayton et al. ................ 131/340
5,178,760 A * 1/1993 Solberg, Jr. ................... 210/451
5,390,668 A * 2/1995 Lehman ................... 128/205.27
5,492,551 A * 2/1996 Wolfe ............................ 55/496
5,855,562 A * 1/1999 Moore et al. .................. 604/119
6,349,721 B1 * 2/2002 Grilliot et al. ........... 128/201.29
2006/0283453 A1 * 12/2006 Haddad .................... 128/205.29

* cited by examiner

*Primary Examiner* — Duane Smith
*Assistant Examiner* — Karla Hawkins
(74) *Attorney, Agent, or Firm* — The Law Office of Jerry D. Haynes

(57) ABSTRACT

A protective cover for preventing entry of particulate matter into a delivery hose of a respiratory device includes a filter member having a peripheral edge portion. The filter member is composed of a filter material having a mesh size capable of preventing the particulate matter to pass therethrough. The protective cover further includes a support member having an inner edge portion and an outer edge portion. The inner edge portion of the support member is attached to the peripheral edge of the filter member, such that, the support member circumferentially surrounds the filter member. Furthermore, the protective cover includes a securing member attached to the outer edge portion of the support member, such that, the securing member circumferentially surrounds the support member. The securing member is capable of gripping an end portion of the delivery hose of the respiratory device.

7 Claims, 2 Drawing Sheets

PROTECTIVE COVER FOR RESPIRATORY DEVICE

FIELD OF THE INVENTION

The present invention relates generally to a protective cover for respiratory devices, and more particularly, to a protective cover for preventing the entry of particulate matter in delivery hoses of respiratory devices and for protecting mouthpieces of the respiratory devices from the particulate matter.

BACKGROUND OF THE INVENTION

A respiratory device, such as an apnea machine, is commonly employed for administering inhalation therapy to patients suffering from respiratory disorders, such as sleep apnea disorder.

A typical respiratory device includes an air generating chamber that includes an air pump for constantly generating pressurized air. Further, the respiratory device includes a delivery hose operatively connected to the air generating chamber. The delivery hose transfers the pressurized air generated in the air generating chamber to an interface worn by a patient. The interface may either be in the form of an air-tight face mask or in the form of a lip-seal mouthpiece. The interface may hereinafter interchangeably be referred to as a "mouthpiece."

It has been observed that with time, the delivery hose of the respiratory device gets contaminated with particulate matter, when the respiratory device is not in operation. The term "particulate matter," as used herein, refers to dust mites, ash particles, smoke residues, dander, and other such contaminants, which may be present in the air.

Use of a contaminated delivery hose may prove hazardous for patients using the respiratory device. Specifically, the particulate matter may intermix with the pressurized air flowing through the delivery hose. Consequently, the patients may inhale the particulate matter along with the pressurized air through the mouthpiece. Accordingly, various protection systems have been developed to prevent the contamination of delivery hoses and to protect mouthpieces of various respiratory devices, including apnea machines.

However, the protection systems developed so far suffer from various shortcomings. Typically, the protection systems are incapable of completely preventing the entry of the particulate matter into the delivery hoses. Moreover, the protection systems are difficult to manufacture and use because of complex arrangements thereof. In addition, the protection systems are cost-ineffective because of the use of expensive materials to manufacture the protection systems.

Accordingly, there is a need to develop a protection system that prevents the entry of particulate matter in a delivery hose of a respiratory device (such as an apnea machine) and protects a mouthpiece of the respiratory device from the particulate matter. Further, there is a need for a protection system that is easy to manufacture and use. Furthermore, there is a need for a protection system that is inexpensive to manufacture.

SUMMARY OF THE INVENTION

In view of the foregoing disadvantages inherent in the prior art, the general purpose of the present invention is to provide a protection system in the form of a protective cover that may be employed in a respiratory device, such as an apnea machine, which includes all the advantages of the prior art, and overcomes the drawbacks inherent therein.

Accordingly, an object of the present invention is to provide a protective cover that is capable of preventing the entry of particulate matter in a delivery hose of a respiratory device and capable of protecting a mouthpiece of the respiratory device from the particulate matter.

Another object of the present invention is to provide a protective cover that may be easy to manufacture and use.

Yet another object of the present invention is to provide a protective cover that is inexpensive to manufacture.

In light of the above objects, the present invention discloses a protective cover for preventing entry of particulate matter into a delivery hose of a respiratory device, thereby protecting a mouthpiece of the respiratory device (such as an apnea machine). The protective cover includes a filter member having a peripheral edge portion. The filter member is composed of a filter material having a mesh size capable of preventing the particulate matter to pass therethrough. Further, the protective cover includes a support member having an inner edge portion and an outer edge portion. The inner edge portion of the support member is attached to the peripheral edge of the filter member, such that, the support member circumferentially surrounds the filter member. Furthermore, the protective cover includes a securing member attached to the outer edge portion of the support member, such that, the securing member circumferentially surrounds the support member. The securing member is capable of gripping an end portion of the delivery hose of the respiratory device.

This together with other embodiments of the present invention, along with the various features of novelty that characterize the present invention, are pointed out with particularity in the claims annexed hereto and form a part of this disclosure. For a better understanding of the present invention, its operating advantages, and the specific objects attained by its uses, reference should be made to the accompanying drawings and the descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, in which:

Like reference numerals refer to like parts throughout the description of the drawings.

DETAILED DESCRIPTION OF THE INVENTION

Figure 1:
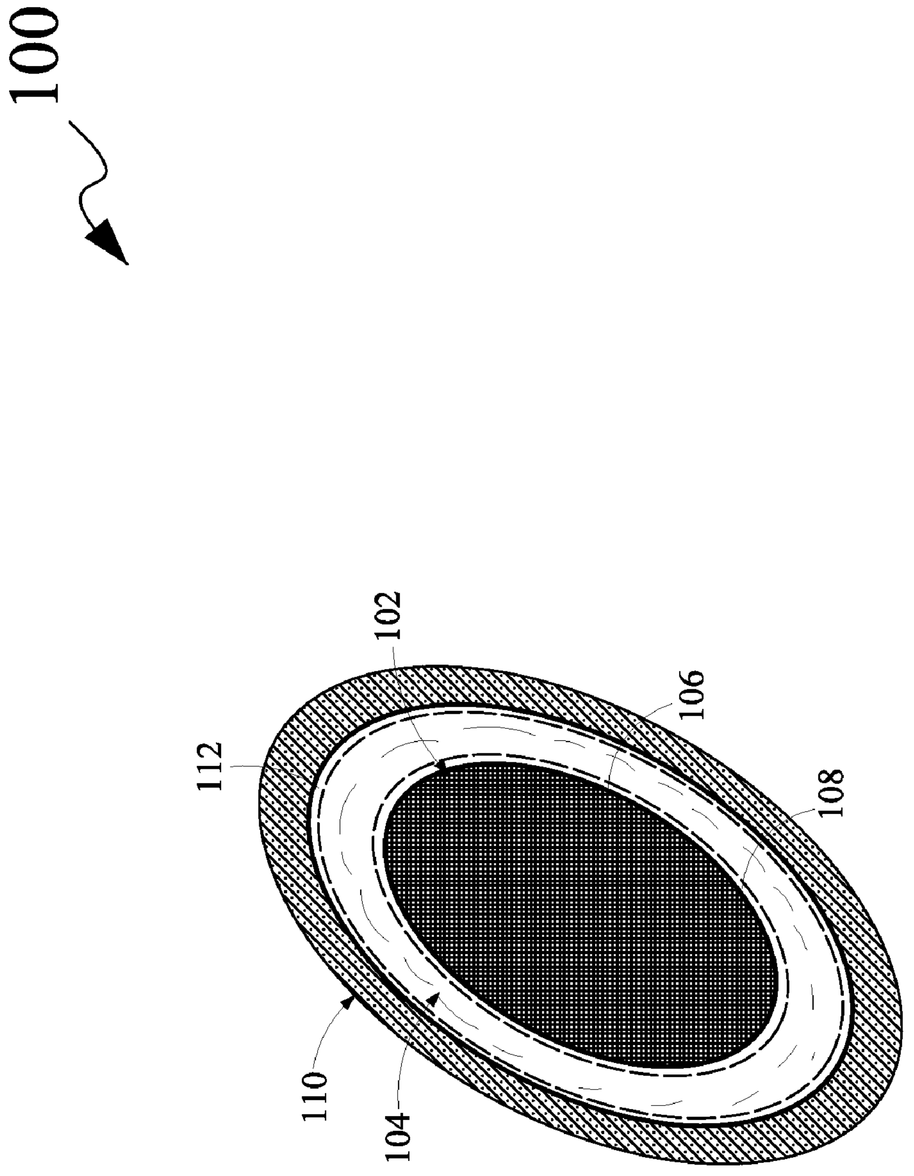
FIG. 1 depicts a protective cover for use in a respiratory device, according to an exemplary embodiment of the present invention.

The exemplary embodiments described herein detail for illustrative purposes are subject to many variations in structure and design. It should be emphasized, however, that the present invention is not limited to a particular protective cover, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a" and "an" herein do not denote a limitation of quantity, but rather denote the presence of at least one of the referenced item.

The use of "including," "comprising," or "having" and variations thereof herein is meant to encompass the items listed thereafter and equivalents thereof as well as additional items. In addition, use of the terms "attached," "configured," "secured" and variations thereof is not restricted to physical or mechanical attachments, configurations or association. Unless limited otherwise, the terms "attached," and variations thereof herein are used broadly and encompass direct and indirect attachments.

The present invention provides a protective cover for preventing entry of particulate matter into a delivery hose of a respiratory device, thereby protecting a mouthpiece of the respiratory device from the particulate matter. The term "respiratory device," as used herein refers to a device for administering inhalation therapy to patients suffering from respiratory disorders. Accordingly, a suitable example of the respiratory device may be an apnea machine, which is employed for the administration of inhalation therapy to a patient suffering from an apnea disorder, and more specifically, a sleep apnea disorder. For the purpose of this description, the term "respiratory device" may hereinafter be referred to as "apnea machine". In addition, the term "particulate matter" as used herein refers to dust particles, dust mites, smoke particles, organic residues, ash particles, dander, and the like, usually present in air. Furthermore, the term, "mouthpiece" refers to an interface connected to the delivery hose and is worn by a patient for inhaling oxygen or air generated by an air generating chamber of the respiratory device. Such an interface may either be in the form of an air-tight face mask or in the form of a lip-seal mouthpiece.

The protective cover of the present invention includes a filter member having a peripheral edge portion. The filter member is composed of a filter material having a mesh size capable of preventing the particulate matter to pass therethrough. Further, the protective cover includes a support member having an inner edge portion and an outer edge portion. The inner edge portion of the support member is attached to the peripheral edge portion of the filter member, such that, the support member circumferentially surrounds the filter member. Furthermore, the protective cover includes a securing member attached to the outer edge portion of the support member, such that, the securing member circumferentially surrounds the support member. The securing member is capable of gripping an end portion of the delivery hose of the respiratory device. The protective cover of the present invention is explained in detail in conjunction with FIG. 1.

FIG. 1 depicts the protective cover, such as a protective cover 100. The protective cover 100 includes a filter member 102. The filter member 102 is composed of a filter material having a mesh size capable of preventing the passage of the particulate matter therethrough. Accordingly, suitable examples of the filter material may include, but are not limited to, cotton, polyester, polypropylene, carbon, fiberglass, and metal strands. However, for the purpose of this description, the filter material is a cotton cloth, which may be characterized by a mesh size less than about 10 micrometers. The filter member 102 prevents the entry of the particulate matter into a delivery hose of a respiratory device, such as an apnea machine (not shown in FIG. 1). The configuration of the protective cover 100 onto the delivery hose of the apnea machine will be described later in conjunction with FIG. 2.

According to an embodiment of the present invention, the filter member 102 is elliptical in shape. It should be understood that the elliptical shape of the filter member 102 as depicted in FIG. 1 is only for exemplary purposes and should not be construed as a limitation to the present invention. Accordingly, the filter member 102 may be designed to have any other shape, such as a shape of a circle, a square and a rectangle. Moreover, it will be apparent that the filter member 102 may have a size in accordance with size of a standard delivery hose available in market.

In addition to the filter member 102, the protective cover 100 includes a support member 104. As depicted in FIG. 1, the support member 104 circumferentially surrounds the filter member 102. Specifically, the support member 104 is attached to a peripheral edge portion 106 of the filter member 102. More specifically, the support member 104 may be sewed to the peripheral edge portion 106 of the filter member 102. Even more specifically, an inner edge portion 108 of the support member 104 may be sewed to the peripheral edge portion 106 of the filter member 102. However, it should be understood that the support member 104 may be attached to the peripheral edge portion 106 of the filter member 102 using any other mechanism known in the art. For example, the peripheral edge portion 106 of the filter member 102 may be attached to the inner edge portion 108 of the support member 104 using hook-and-loop fasteners.

It should be apparent that the support member 104 may provide a hollow space at a central portion thereof for accommodating the filter member 102 there within, such that, the filter member 102 circumferentially couples with the support member 104.

The support member 104 provides support to the filter member 102. Therefore, the support member 104 may be composed of a fabric material, preferably having a high tensile strength. For the purpose of this description, the fabric material employed is a cotton cloth. It should be understood that the support member 104 may be of a shape similar to that of the filter member 102. For the purpose of this description, the support member 104 is elliptical in shape (as depicted in FIG. 1). Moreover, size of the support member 104 is also in accordance with the size of the standard delivery hose available in the market.

The protective cover 100 further includes a securing member 110. As depicted in FIG. 1, the securing member 110 circumferentially surrounds the support member 104. Specifically, the securing member 110 is attached to an outer edge portion 112 of the support member 104. More specifically, the securing member 110 may be sewed to the outer edge portion 112 of the support member 104. However, it should be understood that the securing member 110 may be attached to the outer edge portion 112 of the support member 104 using any other mechanism known in the art The main function of the securing member 110 is to grip the delivery hose of the apnea machine for a detachable attachment of the protective cover 100 to the delivery hose. More specifically, the securing member 110 conforms according to the shape and size of the delivery hose of the apnea machine for gripping thereto. It will be apparent to a person skilled in the art that such a gripping of the securing member 110 onto the delivery hose of the apnea machine helps in configuring the protective cover 100 onto the delivery hose of the apnea machine. Accordingly, the securing member 110 may be composed of a resilient material. For the purpose of this description, the securing member 110 is an elastic strap. However, it should be understood that other materials that are capable of providing a resilient characteristic to the securing member 110, may also be used.

It should be understood that the protective cover 100 is capable of easily conforming and securing to a mouthpiece of the apnea machine with the help of the securing member 110, which is capable of gripping the delivery hose of the respiratory device.

Figure 2:
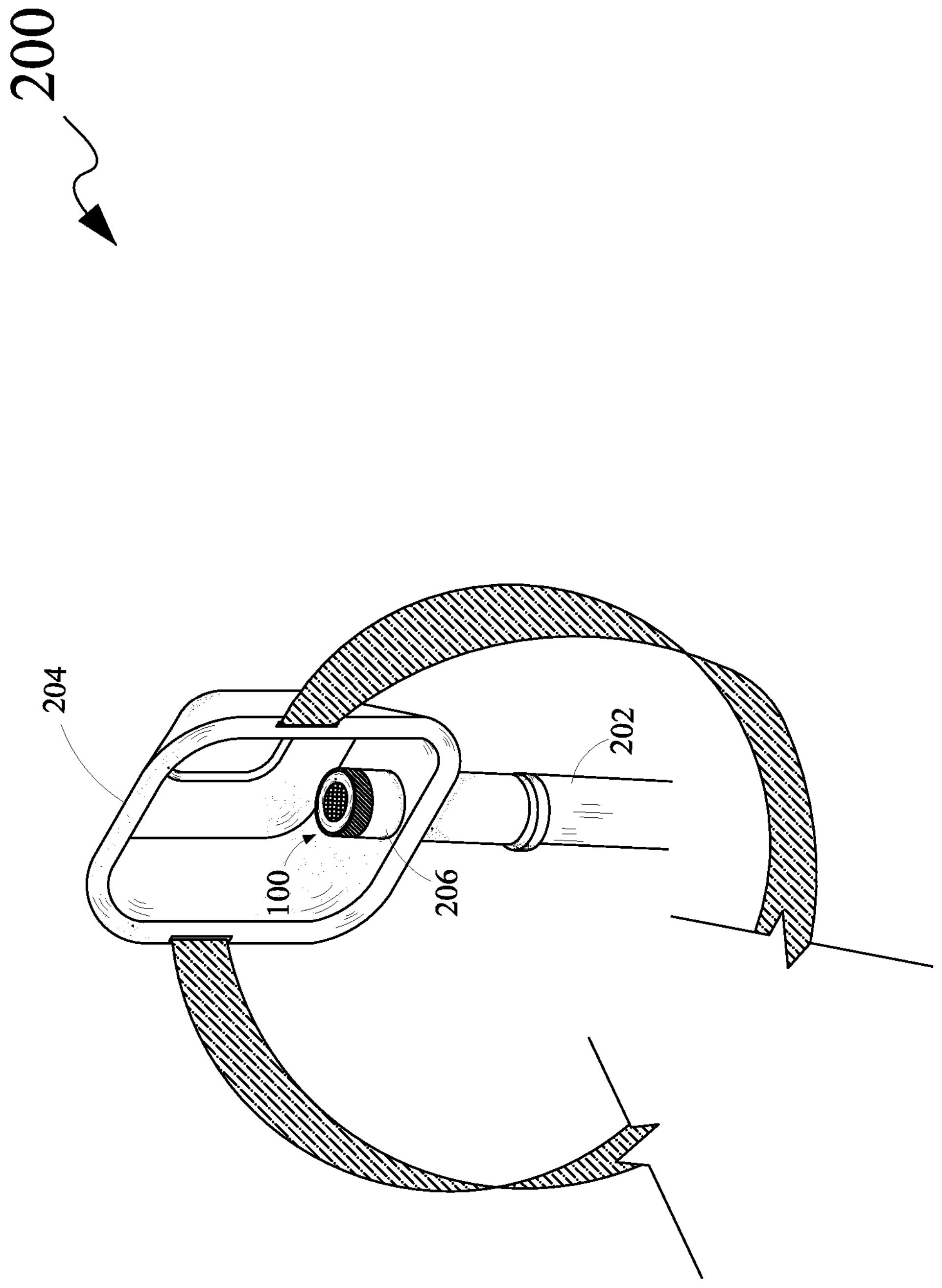
FIG. 2 depicts a perspective partial view of an apnea machine that employs the protective cover of FIG. 1, according to an exemplary embodiment of the present invention.

A perspective partial view of an apnea machine 200 employing the protective cover 100 of FIG. 1 is depicted in FIG. 2. Specifically, FIG. 2 depicts a portion of the apnea machine 200 to illustrate configuration of the protective cover 100. More specifically, FIG. 2 depicts a delivery hose 202 with the protective cover 100 and a mouthpiece 204 of the apnea machine 200. As shown in FIG. 2, the protective cover 100 is configured onto the delivery hose 202, and more specifically onto an end portion 206 of the delivery hose 202 of the apnea machine 200. It should be understood that the protective cover 100 is configured onto the end portion 206 only when the apnea machine 200 is not operational. Further, it will be apparent that the protective cover 100 is removed from the end portion 206 of the delivery hose 202 when the apnea machine 200 is operational. Furthermore, it will be apparent that an additional mechanism, such as a string tightening mechanism (not shown) may be employed for completely configuring the protective cover 100 onto the delivery hose 202 of the apnea machine 200. Specifically, a string may be used for securing and supporting the protective cover 100 onto the delivery hose 202 of the apnea machine 200.

In addition, the components of the protective cover 100, i.e., the filter member 102, the support member 104, and the securing member 110 may be provided in attractive colors, in order to provide an aesthetic appeal to the protective cover 100. It should be understood that such colors may be selected by a manufacturer or a user of the protective cover 100.

In use, the protective cover 100 when configured onto the end portion 206 of the delivery hose 202 prevents the entry of the particulate matter therethrough, thereby, preventing contamination of the delivery hose 202 of the apnea machine 200 and protecting the mouthpiece 204 from the particulate matter. More specifically, the protective cover 100 is configured onto the delivery hose 202 of the apnea machine 200 with the help of the securing member 110, when the apnea machine 200 is not operational. Accordingly, the filter member 102 of the protective cover 100 prevents the entry of the particulate matter in the delivery hose 202 of the apnea machine 200. Therefore, the protective cover 100 prevents a situation wherein the user inhales contaminants (i.e. the particulate matter) that may enter and reside in the delivery hose 202 of the apnea machine 200.

Based on the forgoing, the present invention provides a protective cover, such as the protective cover 100, capable of preventing the entry of particulate matter into a delivery hose of a respiratory device, such as an apnea machine, and capable of protecting a mouthpiece of the respiratory device from the particulate matter. Further, the protective cover is easy to use. Furthermore, the protective cover is inexpensive to manufacture because of the use of inexpensive materials, such as cotton. Moreover, the protective cover is light-weight as the manufacturing thereof involves use of light-weight materials, such as cotton. In addition, the protective cover may be available in attractive colors according to the choice of a manufacturer or a user of the protective cover.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and thereby enable others skilled in the art to best utilize the present invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

What is claimed is:

1. A protective cover for preventing entry of particulate matter into a delivery hose of a respiratory device, the protective cover comprising:

a filter member having a peripheral edge portion, the filter member composed of a filter material having a mesh size capable of preventing the particulate matter to pass therethrough;

a support member having an inner edge portion and an outer edge portion, the inner edge portion of the support member being attached to the peripheral edge of the filter member, such that, the support member circumferentially surrounds the filter member, where the support member is made of a fabric material; and a securing member attached to the outer edge portion of the support member, such that, the securing member circumferentially surrounds the support member, the securing member capable of gripping an end portion of the delivery hose of the respiratory device such that both the securing member and the protective cover conform to the shape and size of the end portion when the respiratory device is not in operation.

2. The protective cover of claim 1, wherein the filter material is a cotton cloth.

3. The protective cover of claim 1, wherein the filter material is selected from the group consisting of polyester, polypropylene, carbon, fiberglass, and metal strands.

4. The protective cover of claim 1, wherein the fabric material is a cotton cloth.

5. The protective cover of claim 1, wherein the securing member is an elastic strap.

6. The protective cover of claim 1, wherein the support member is attached to the filter member by sewing the inner edge of the support member to the peripheral edge of the filter member.

7. The protective cover of claim 1, wherein a string further secures the protective cover onto the delivery hose.

* * * * *